United States Patent Office 3,113,302
Patented Dec. 3, 1963

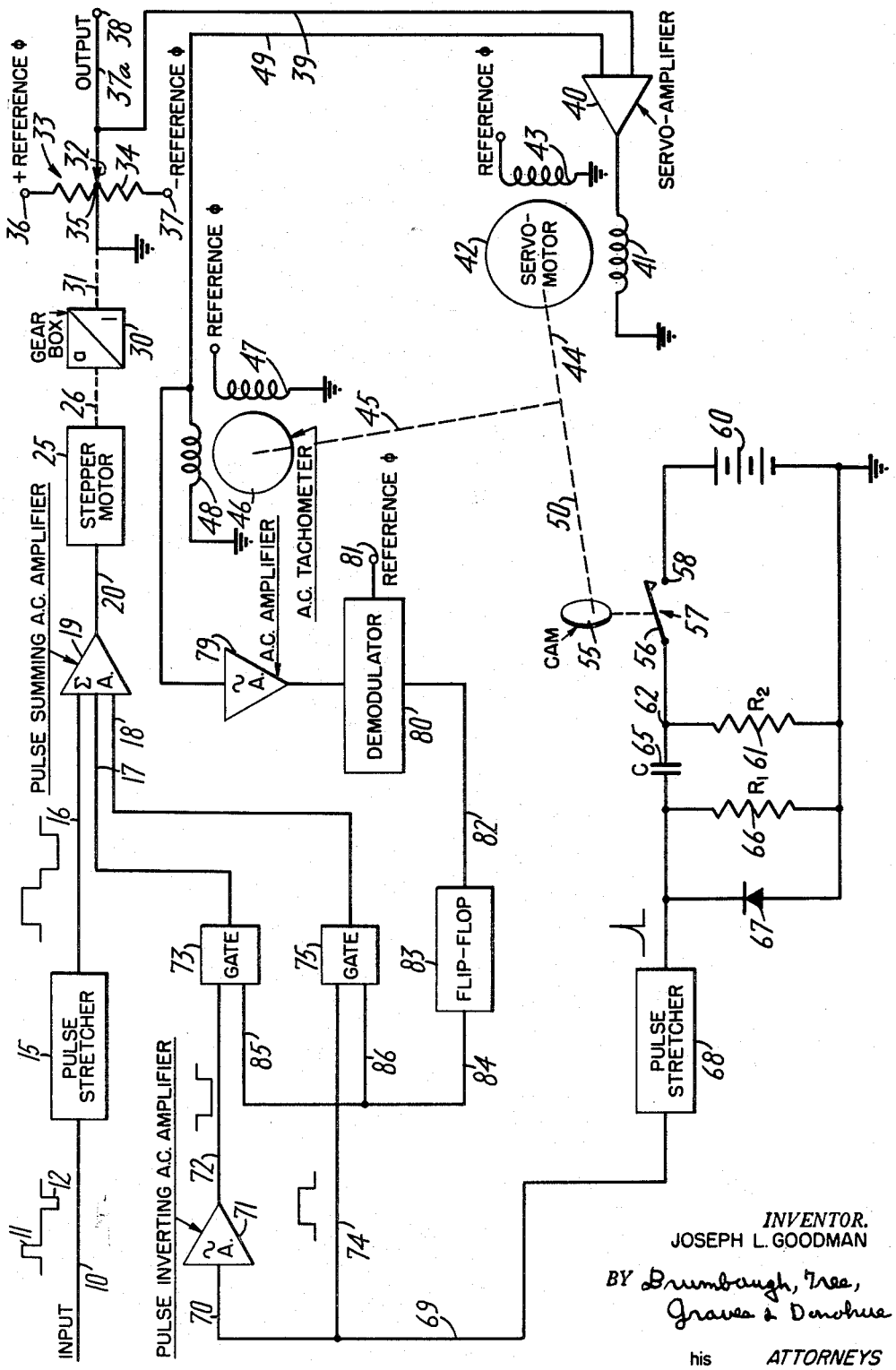

3,113,302
CONVERTER APPARATUS FOR RATE
MODULATED PULSES
Joseph L. Goodman, Rockville, Md., assignor to Vitro
Corporation of America, New York, N.Y.
Filed Jan. 25, 1960, Ser. No. 4,345
17 Claims. (Cl. 340—347)

This invention relates to apparatus for extracting from rate-modulated carrier pulses the information represented by the rate modulation thereof.

Objects of the invention are to obtain such information in the form of an analog signal, to convert the rate-modulated pulses into an analog signal either in the instance where the pulses are one polarity or in the instance where the pulses are at different times of opposite polarity, to maintain a constant relation between the variable value of the analog signal and the variable rate of the carrier pulses, to interpose a filtering effect between the carrier pulses and the analog signal whereby the value of the analog signals reflects changes in carrier pulse rate to a lesser degree for fast changes than for slow changes, and to render such filtering effect a function of the value of the analog signal.

These and other objects are realized by providing a closed loop type of apparatus of which one component is an accumulator means responsive to actuating pulses of either polarity to produce an output which varies in magnitude with the difference in accumulation by such means of actuating pulses of one and of opposite polarity. This accumulator means may be, say, a stepper motor which moves forward a unit step for each received pulse of positive polarity, and which moves backward a unit step for each received pulse of negative polarity.

The apparatus also includes pulse encoder means which acts as a source of feedback pulses. This encoder means may comprise a switch means which is cyclically urged to make and break contacts by a rotating camming means. The feedback pulses from the encoder means have a polarity which is generally in opposed relation to the polarity of the rate-modulated carrier pulses. For example, if the carrier pulses are always positive, the feedback pulses are always negative. On the other hand, if the carrier pulses change from positive to negative, the feedback pulses likewise change but from negative to positive. The rate at which the feedback pulses are produced is controlled by, say, controlling the speed of rotation of the mentioned camming means.

The actuating pulses for the accumulator means are provided by supplying the carrier pulses and the feedback pulses to a pulse summing means which may be, say, a linear pulse amplifier. This summing means combines together the received carrier and feedback pulses (while preserving their relative polarities) to form the mentioned actuating pulses. The feedback pulse rate is controlled to produce equalization of that rate with the carrier pulse rate. Equalization of such rates results in stability of the difference between the respective accumulations by the accumulator means of actuating pulses of one polarity and of actuating pulses of opposite polarity. Hence when such means is a stepper motor, the motor remains stationary in the position to which it has previously moved by unit steps.

The loop of the apparatus is closed by a regulator means which is controlled by the output of the accumulator means to control the encoder means to determine the rate at which feedback pulses are produced. The regulator means may be, say, a rate servo-system. In operation the regulator means responds to the output of the accumulator means to govern the feedback pulse rate so as to re-equalize that rate with the carrier pulse rate following a change in the latter. By virtue of this action of the regulator means, the output of the accumulator means is rendered an analog signal of the rate modulation of the carrier pulses.

For a better understanding of the invention, reference is made to the following description of an exemplary embodiment thereof, and to the accompanying drawing which is a schematic diagram of such embodiment. Referring to the drawing, carrier pulses are applied to an input lead 10 from a source (not shown). The carrier pulses are modulated in rate from say, zero p.p.s. to, say, 60 p.p.s. Such modulation is produced by a modulating signal which may be, say, a telemetering signal. The telemetering signal may be representative of variation in a physical quantity as, say, acceleration.

Positive and negative amplitudes of the modulating signal are represented by pulses of positive polarity (such as pulse 11 shown above lead 10) and by pulses of negative polarity (such as the pulse 12 above the lead 10). An amplitude of zero of the modulating signal is represented by a carrier pulse rate of 0 p.p.s. Thus, 0 p.p.s. is the reference rate. At any time, the departure in the carrier pulse rate from 0 p.p.s. is proportional in amount to the absolute magnitude of the modulating signal.

The carrier pulses on lead 10 are applied through pulse stretcher 15 and by lead 16 to one input of a pulse summing means 19. This means may be a linear pulse amplifier. The amplifier 19 also receives feedback pulses from one at a time of two signal channels represented by, respectively, the leads 17 and 18. Those feedback pulses are generated in a manner later described.

The amplifier 19 is responsive to received pulses of either polarity to amplify such pulses in a manner whereby the relative polarities of individual pulses are preserved. By this is meant that amplifier 19 has an amplifying action wherein input pulses of the same polarity appear as output pulses of the same polarity (although possibly reversed in polarity relative to the input pulses), and wherein input pulses of opposite polarity appear as output pulses of opposite polarity (although, possibly, each output pulse is the same in polarity as the corresponding input pulse). In the described embodiment, the amplifier 19 is a non-inverting amplifier although an inverting amplifier may also be used.

The amplifier 19 combines the received carrier and feedback pulses to form on output lead 20 a train of intermixed carrier and feedback pulses. Those pulses on lead 20 are referred to hereafter as actuating pulses.

The described actuating pulses are applied to a stepper motor 25 which drives a shaft 26. In the shown embodiment the motor 25 may be a 60 p.p.s. Giannini stepping motor. Other commercially available stepper motors may be used, if desired.

The stepper motor 25 is connected so that each positive actuating pulse energizes the motor to rotate shaft 26 in the clockwise direction through a single step which has a value of, say, 1°. Conversely, each negative actuating pulse produces rotation of shaft 26 in the counterclockwise direction through a single step of the same value.

In order for an actuating pulse to operate stepper motor 25, the actuating pulse must be of proper amplitude and of a minimum width which is on the order of 15 milliseconds for the mentioned Giannini motor. The pulse stretcher 15 serves to convert carrier pulses on lead 10 which do not satisfy those requirements into actuating pulses which do. The use of a pulse stretcher thus broadens the acceptable tolerances for the amplitude and for the width of the carrier pulses on lead 10. For example, the pulse width may vary from a maximum of, say, 10 milliseconds to a minimum which is limited only by the value which can be recognized by pulse stretcher 15 consonant with noise rejection provided by the stretcher. Thus, the minimum pulse width can be as low as .01 millisecond when the nominal value for pulse width is 1 millisecond. Evidently, the pulse stretcher 15 can be altogether dispensed with in the instance where the carrier pulses on lead 10 have amplitudes and widths which are each suitable as is to operate the stepper motor 25.

The shaft 26 drives through a gear box 30 a shaft 31 which is coupled to the wiper 32 of a potentiometer unit 33. This wiper 32 is driven by shaft 31 over an arcuate resistance winding 34 of the potentiometer. The winding 34 is connected to ground by a center tap 35 and is connected by opposite end terminals 36, 37 to alternating current sources (not shown) which develop alternating current voltages of equal amplitude but of opposite phase across the upper and lower halves of the winding. That one of those two voltages which is developed between terminals 36 and 35 is referred to hereafter as the voltage of reference phase, whereas the other voltage between terminals 37 and 35 is referred to hereafter as the voltage of anti-reference phase. Evidently, the voltages of reference and of anti-reference phase can be considered as alternating voltages of positive and of negative polarity, respectively.

The shaft 26 is coupled through elements 30, 31 to wiper 32 in such manner that each clockwise step of shaft 26 moves wiper 32 one step over winding 34 in the "positive" direction, i.e., from terminal 37 to terminal 36. Conversely, each counterclockwise step of shaft 26 moves wiper 32 one step over winding 34 in the "negative" direction, i.e., from terminal 36 to terminal 37. This movement in unit steps of wiper 32 produces an angular displacement $\theta$ of wiper 32 relative to center tap 35, the displacement being positive when wiper 32 is displaced from tap 35 towards terminal 36, and the displacement being negative when wiper 32 is displaced from tap 35 towards terminal 37.

When, at the start of operation, the wiper 32 has been pre-set to rest on tap 35 and thus be at the zero point for the wiper, at any time thereafter the angular displacement in unit steps of wiper 32 is equal to the difference between the sum of the positive actuating pulses received or "accumulated" by stepper motor 25 since the start of operation and the sum of the negative actuating pulses received or "accumulated" by the motor 25 since that time. If the accumulation since starting time of positive actuating pulses is larger than the accumulation over the same time of negative actuating pulses, the angular displacement $\theta$ will be positive in sign. Conversely, if the accumulation since starting time of negative actuating pulses is larger than the accumulation over the same time period of positive actuating pulses, then the angular displacement $\theta$ will be negative in sign. Evidently, any angular displacement $\theta$ of positive sign can be viewed as made up of a sum of positive unit steps of wiper 32 over winding 34, and, similarly, any angular displacement $\theta$ of negative sign can be viewed as made up of the sum of a number of negative unit steps of wiper 32 over winding 34.

The output of potentiometer unit 33 is an alternating voltage E appearing on wiper 32. The amplitude of this voltage is related to the angular displacement $\theta$ of the wiper by the expression:

$$E = K_2 \theta$$

Where $K_2$ is a winding factor correlated with the distribution of the resistance of winding 34 over its length. If desired, the resistance per unit length of winding 34 may be of the same value at all points on the winding to thereby render the factor $K_2$ a constant. However, for reasons later explained, I have found it advantageous for the resistance per unit length of the winding to increase with distance away in either direction from the center tap 35, and, in this instance, the factor $K_2$ varies as a function of $\theta$ and also as a function of E inasmuch as E is a function of $\theta$.

The alternating voltage E is supplied from wiper 32 by a lead 37a to a terminal 38 where the voltage is available for utilization purposes. The same voltage is also supplied by way of a lead 39 to one input of an A.C. servo-amplifier 40 which shifts the applied voltage by 90° in addition to amplifying it. This servo-amplifier energizes a first winding 41 of a two phase servo-motor 42 with an alternating current. A second winding 43 of servo-motor 42 is in space quadrature relation with winding 41 and is energized by alternating current of constant amplitude and of reference phase. The servo-motor 42 is coupled through shaft means indicated by dash lines 44, 45 to drag-cup tachometer 46 and through the shaft means 44 to an output shaft 50 also indicated by a dash line. The drag-cup tachometer may be of the type described in section 12.6 of the text book "Electronic Instruments" which is vol. 21 of the M.I.T. Radiation Laboratory Series (published by the McGraw Hill Book Company, New York, 1948).

The tachometer 46 is energized by alternating current of reference phase applied to an input winding 47. When so energized, the tachometer develops across an output winding 48 an alternating voltage of which the amplitude varies directly with the speed of tachometer rotation. The phase of this alternating voltage corresponds to the direction of tachometer rotation and is either of reference phase or anti-reference phase. The alternating voltage across winding 48 is supplied by a lead 49 to servo-amplifier 40 to there act as an input signal in degenerative feedback relation to the input voltage E supplied to the servo-amplifier by lead 39.

The elements 40—50 together form a type of regulator means which is known to the art as a rate servo-system. One characteristic of the shown rate servo-system is that the speed of rotation of the motor 42 is directly proportional to the amplitude of the alternating wiper voltage E which excites the system. Further, the motor 42 rotates in opposite directions for opposite phases (i.e., polarities) manifested by the voltage E. The result is that the alternating voltage developed across tachometer winding 48 is of reference phase and of anti-reference phase when the voltage E is, respectively, of reference phase and of anti-reference phase.

The motor 42 of the rate servo-system is coupled through the output shaft 50 to a bi-directional camming disc 55 which is rotated by the motor. The disc 55 is an eccentric disc adapted once each revolution to cam a movable contact 56 of a micro switch 57 to closed position with a fixed contact 58 of that switch. After the radially enlarged portion of disc 55 has passed movable contact 56, the movable contact is urged by a biasing spring (not shown) to move away from the fixed contact 58. Thus, in response to the camming action of disc 55, the switch 57 alternately makes and breaks its component contacts.

The switch 57 is connected in a series circuit consisting of: (1) the switch itself, (2) a D.C. voltage source (represented by battery 60) having its positive and negative terminals connected, respectively, to fixed contact 58 and to ground, and (3) a resistor 61 having one of its ends connected through junction 62 to movable contact 56, and having the other of its ends connected to ground. The described series circuit responds to the making and breaking of the contacts of switch 57 to produce positive square wave voltage pulses which appear at junction 62, and of which the leading and lagging edges correspond in time with, respectively, the making action and the breaking action of the contacts of the switch. The rate at which such square wave pulses are produced is equal to the rate of rotation (in whole revolutions) of the camming disc 55.

The square wave pulses at junction 62 are supplied from that junction to a differentiating circuit comprised of a capacitor 65 and of a resistor 66. This circuit operates in a well-known manner to convert the leading and lagging edges of the applied square waves into positive trigger pulses (from the leading edges) and into negative trigger pulses (from the lagging edges). Both types of trigger pulses appear as voltage pulses across resistor 66. The negative trigger pulses are clipped by a diode 67 connected in parallel with resistor 66. The remaining positive trigger pulses are passed to a pulse stretcher 68 which increases their durations. At the output of stretcher 68 the pulses are of the same width as that characterizing the carrier pulses at the output of stretcher 15.

The output pulses from stretcher 68 are applied through lead 69, a lead 70, a pulse inverting amplifier 71 and a lead 72 to the input of a gate circuit 73 whose output is connected through lead 17 to the pulse summing amplifier 19. The same output pulses from stretcher 68 are applied through a lead 69, and a lead 74 to the input of a gate circuit 75 whose output is connected through lead 18 to the amplifier 19. Thus, the pulse stretcher 68 acts as a source of the feedback pulses which have previously been described as being supplied to amplifier 19 through two separate signal channels. Those two channels are an upper channel comprised of elements 70—73 (together with lead 17) and a lower channel comprised of elements 74, 75 (together with lead 18). Amplifier 71 reverses the polarity of the upper channel pulses so that, at the input of gate circuit 73, the upper channel pulses are negative to oppose in polarity the positive pulses applied to the gate circuit 75 of the lower channel.

The two described channels form a circuit combination which permits selection of the polarity of the feedback pulses applied to amplifier 19. In this connection, despite the fact that servo-motor 42 rotates in opposite directions in response to opposite polarities of the voltage E applied to the rate servo-system, the motor does not control the polarity of the feedback pulses by acting upon the pulse generator means (elements 55—62) which is the original source of those pulses. This is so inasmuch as the operation of the series circuit of D.C. source 60, switch 57 and resistor 61 is such as to produce square wave pulses which are of the same polarity whether camming disc 55 is rotated clockwise or counterclockwise by the motor 42. Nonetheless, the direction of rotation of motor 42 controls the polarity of the feedback pulses applied to amplifier 19 in a manner as follows.

As stated, when the wiper voltage E is of reference phase (i.e., positive polarity), the motor 42 rotates in that direction which causes a voltage of reference phase to be developed across tachometer winding 48. Conversely, when wiper voltage E is of anti-reference phase (i.e., negative polarity), the motor 42 rotates in that direction which causes a voltage of anti-reference phase to be developed across winding 48. The alternating voltage which is so developed across winding 48 is applied through an A.C. isolation amplifier 79 to a phase demodulation circuit 80 which also receives a comparison voltage of reference phase from terminal 81. The demodulator circuit 80 actuates through lead 82 a flip-flop unit 83 which may be a simple relay.

When reference phase voltage is received by circuit 80 from amplifier 79, the circuit actuates unit 83 to produce a signal which (through leads 85, 86) is transmitted to gate circuits 73, 75 to turn the gate circuit 73 "on" and the gate circuit 75 "off." Conversely, when voltage of anti-reference phase is received by circuit 80 from amplifier 79, the circuit 80 actuates unit 83 to produce a signal which turns the gate circuit 73 "off" and the gate circuit 75 "on." Each of the gate circuits 73, 75 passes the feedback pulses applied thereto only when that gate circuit is turned "on." Hence, when the wiper voltage E is of reference phase (positive polarity), only feedback pulses of negative polarity are applied to amplifier 19. Conversely, when wiper voltage E is of anti-reference phase (negative polarity), only feedback pulses of positive polarity are applied to amplifier 19.

The operation of the apparatus can best be explained by assuming, to begin with, that the stepper motor 25 has been pre-set to a zero position at which wiper 32 rests on center tap 35, that winding factor $K_2$ is a constant, and that, at the start of operation, the rate of carrier pulses on input lead 10 goes from zero pulses to, say, 20 positive pulses per second. The first positive carrier pulse drives motor 25 one step clockwise to displace wiper 32 from tap 35 by one step in the positive direction (i.e., towards terminal 36). Each successive positive carrier pulse produces a further unit positive displacement of wiper 32 whereby, in the absence of feedback pulses, the positively directed movement of wiper 32 would continue uninterruptedly.

However, as soon as wiper 32 moves positively by one step, an alternating voltage E of positive polarity appears on the wiper. This positive voltage E builds up in amplitude as wiper 32 moves positively by further unit steps. As E so builds up, the voltage E actuates the rate servo-system and the pulse encoder means (elements 55—86) to supply negative feedback pulses to pulse summing amplifier 19 at a rate which starts from an initial value of zero p.p.s., and which builds up in proportion to the building up in amplitude of the positive voltage E. Each such negative feedback pulse serves to displace the wiper 32 a unit step in the negative direction to thereby cancel out the latest occurring positive step. The voltage E and the feedback pulse rate increase together to a crossover value at which the feedback pulse rate equalizes with the carrier pulse rate. Thereupon, the angular displacement of wiper 32 becomes stabilized because of the fact that, when the carrier and feedback pulse rates are equal, the positive steps imparted to the wiper by carrier pulses are offset one for one by the negative steps imparted to the wiper by the negative feedback pulses. When the wiper 32 is so stabilized, the amplitude of the voltage E is proportional to the carrier pulse rate and may be, say, 20 volts, when the carrier pulse rate is 20 p.p.s.

In connection with the above, it does not matter whether or not the positive carrier pulses and the negative feedback pulses overlap in time at amplifier 19. To wit, if a given carrier pulse and a given feedback pulse overlap each other enough to reduce the width of each to a value insufficient to drive stepper motor 25, then the two pulses cancel each other out insofar as concerns the effect they have on the angular displacement of wiper 32. If, on the other hand, the overlap between the carrier pulse and the feedback pulse is so slight as to not impair their respective abilities to drive stepper motor 25, then the positive unit step imparted to wiper 32 by the carrier pulse will be exactly offset by the negative unit step imparted to wiper 32 by the feedback pulse, whereby the two pulses again cancel each other out insofar as concerns the effect they have on the angular displacement of the wiper.

In the described operation, if the rate of carrier pulses changes from 20 positive pulses per second to, say, 10 positive pulses per second, the amplifier 19 momentarily receives more negative feedback pulses than positive carrier pulses. This excess of negative pulses over positive pulses results in a driving of wiper 32 in the negative direction until the feedback pulse rate re-equalizes with the carrier pulse rate to restabilize the wiper 32 at the position for which the voltage E is, say, 10 volts positive to thereby bear the same proportion to the new carrier pulse rate (10 p.p.s.) as the previous 20 volt value of E bore to the old carrier pulse rate (20 p.p.s.).

When the carrier pulses are negative, the operation of the apparatus is the same as that previously described save that positive feedback pulses are applied to amplifier 19 and save that the voltage E is of negative polarity. The polarity of E follows the carrier pulse polarity which, in turn, is representative of the polarity of the signal by which the carrier pulses are rate modulated. The amplitude of E is proportional to the carrier pulse rate, and, thus, to the magnitude of the signal by which the carrier pulses are rate modulated. Therefore, the voltage E is an analog signal of the information which is represented by the rate modulation of the carrier pulses. As previously stated, the analog signal E is available at terminal 38 for utilization purposes.

When the carrier pulses change polarity, the polarity of the feedback pulses follow in opposed relation the polarity of the carrier pulses in the sense that, when the carrier pulses change from positive to negative, the feedback pulses change from negative to positive and, also, when the carrier pulses change from negative to positive, the feedback pulses change from positive to negative. Thus, it is generally the case that the polarity of the feedback pulses is instantaneously in opposition to whichever polarity is manifested by the carrier pulses. However, there are transient intervals during which the polarity of the feedback pulses will be the same as that of the carrier pulses.

For example, suppose that the carrier pulses suddenly change from 20 positive pulses per second to 20 negative pulses per second. Just before this change takes place, the voltage E has a value of 20 volts positive, and, correspondingly, the amplifier 19 is receiving 20 negative feedback pulses per second. When the change does take place, voltage E cannot follow instantaneously the change in the carrier pulses from positive to negative. Instead, voltage E can follow this change only as fast as is permitted by the rate of non-cancelled actuating pulses received by stepper motor 25. Therefore, after the carrier pulses have so switched from positive to negative, there is a finite period during which the voltage E is changing towards negative polarity, but is still of positive polarity, whereby feedback pulses of negative polarity are still being supplied to amplifier 19. Under that condition, the carrier pulses to amplifier 19 and the feedback pulses to amplifier 19 are both of the same polarity in that both are negative. Hence, within the mentioned transient period, all actuating pulses received by stepper motor 25 are of the same negative polarity. This, however, is not disadvantageous inasmuch as the result of having all actuating pulses of negative polarity for a limited time period is to speed up the transition of wiper 32 from its old position corresponding to 20 positive carrier pulses per second to its new position corresponding to 20 negative carrier pulses per second.

Evidently, in the converse situation where the carrier pulses shift from negative to positive, there again occurs a transient period during which both the carrier pulses and the feedback pulses applied to amplifier 19 are pulses of the same polarity, both types of pulses being positive. Thus, while the polarity of the feedback pulses always follows in opposed relation the polarity of the carrier pulses, the polarity of the feedback pulses is not always instantaneously the opposite of that of the carrier pulses.

So far, the effect of the winding factor $K_2$ has not been taken into account. Suppose that this winding factor is constant but is of a relatively low value which adds only one-half volt magnitude to E per unit step of wiper 32. By this supposition, when the carrier pulse rate is changed from zero pulses to 20 positive pulses per second, the wiper 32 moves positively by 40 unit steps before the voltage E builds up to the value of 20 positive volts at which negative feedback pulses are supplied to amplifier 19 at a rate equaling that of the incoming carrier pulses, and at which, therefore, the wiper position is stabilized. Suppose on the other hand that the factor $K_2$ is of a relatively high value which adds two volts magnitude to E for each unit step of wiper 32. In this latter instance, the wiper 32 need take only 10 positive steps in order to build up the voltage E to the value of 20 positive volts at which the wiper is stabilized in position.

The above comparison shows that variation in the value of the winding factor $K_2$ has no effect in the described apparatus upon the "gain" thereof, i.e., upon the value of the ratio $E/c$ where $c$ is the carrier pulse rate. On the other hand, the value of the factor $K_2$ has a definite effect upon the speed of response of the apparatus. For example, when $K_2$ is of the low value which adds only one-half volt magnitude to E per unit step of wiper 32, it takes the wiper longer to reach its stable position than in the instance when the factor $K_2$ is of the high value which adds two volts magnitude to E per unit step.

The feature that $K_2$ does not affect gain but does affect speed of response may be taken advantage of to provide apparatus of the sort described which is characterized by substantially constant gain and, at the same time, by a speed of response which varies directly with $\theta$ so that, as $\theta$ increases, the speed of response also increases. This combination of characteristics is obtained by providing a resistance winding 34 for which the resistance per unit length is relatively low in value at center tap 35 but progressively increases in value with distance in either direction away from the tap 35 and along the winding 34.

When $K_2$ is variable in this manner, the described apparatus is equivalent to a low pass filter of variable bandwidth. To wit, when wiper 32 is spaced quite far away from tap 35 to yield a high speed of response, fast variations in the carrier pulse rate will be reflected with relatively little attenuation as amplitude variations in the voltage E. Now, equating fast variations to high frequency, this relatively low attenuation of high frequency is characteristic of a low pass filter with a cut off frequency above the high frequency considered, i.e., with a relatively large pass band. On the other hand, when wiper 32 is near tap 35 to yield a low speed of response, the fast variations in the carrier pulse rate will be substantially attenuated insofar as those rate variations are reflected in the amplitude variations of voltage E. This condition of substantial attenuation of high frequency variations is a characteristic of a low pass filter having a cut off frequency below the high frequency considered, i.e., with a relatively small pass band. Thus, when the factor $K_2$ is made variable, as described, to give a high speed of response for a large value of $\theta$ and a low speed of response for a small value of $\theta$, the apparatus acts overall as a low pass filter whose pass band changes from relatively narrow to relatively wide as $\theta$ increases.

A variable bandwidth filter of this sort is often advantageous in applications where the carrier pulses are rate-modulated by, say, an error signal. This is so because it is frequently the case that, when the error is high, the device receiving the filtered error signal should be fully sensitive to error variations to the end of rapidly returning the error to a tolerable value whereas, when the error is low, such device should be somewhat insensitive to error variations in the view that for low total error the error variations are relatively unimportant.

While the operation of the apparatus has been described above in a qualitative manner, it can also be defined mathematically as follows:

The relation between the rate $a$ of non-cancelled actuating pulses effective to drive stepper motor 25 and the angular displacement $\theta$ of wiper 32 is given by the expression:

$$\theta = K_1 a/s \qquad (1)$$

where $s$ is the Laplace transform variable and $K_1$ is a proportionality constant. Also, as previously stated, $$E = K_2 \theta \qquad (2)$$

The feedback pulse rate $f$ is related to E by the expression:

$$f = K_3 E \qquad (3)$$

where $K_3$ is another proportionality constant.

From (2) and (3) it follows that:

$$f = K_2 K_3 \theta \qquad (4)$$

The relation between the carrier pulse rate $c$, the feedback pulse rate $f$ and the rate $a$ of non-cancelled actuating pulses is $$a = c - f \tag{5}$$

Substituting from (1) and (4), Expression 5 translates into:

$$\frac{s\theta}{K_1} = c - K_2 K_3 \theta \tag{6}$$

or $$\left(\frac{s}{K_1} + K_2 K_3\right)\theta = c \tag{7}$$

or $$\frac{\theta}{c} = \frac{1}{\left(\frac{s}{K_1} + K_2 K_3\right)} \tag{8}$$

Now, if both top and bottom of the right hand side of (8) are multiplied by the factor $1/K_2 K_3$, the result is:

$$\frac{\theta}{c} = \frac{1/K_2 K_3}{\left(\frac{s}{K_1 K_2 K_3}\right) + 1} \tag{9}$$

The time constant $T$ of the apparatus is equal to the quantity $1/K_1 K_2 K_3$ and can be substituted into (9) to yield:

$$\frac{\theta}{c} = \frac{1/K_2 K_3}{Ts + 1} \tag{10}$$

Thereafter, by first substituting the value of $\theta$ derivable from (2) for $\theta$ in the left hand side of (10), and by then cancelling $1/K_2$ on both sides, Expression 10 converts into $$E/c = \frac{1/K_3}{Ts + 1} \tag{11}$$

Expression 11 is the expression for the gain $E/c$ of the apparatus.

The above described embodiment being exemplary only, it is to be understood that the invention set forth herein comprehends embodiments differing in form and/or detail from the embodiment which has been specifically disclosed. For example, the camming disc 55 may be contoured to produce making and breaking of the contacts of micro switch 57 more than once for each revolution of the camming disc. In the place of a sign discriminator means in the form of the disclosed phase demodulator circuit 80, there may be employed a sign discriminator means which responds directly to the polarity of the carrier pulses on lead 10 to control gate circuits 73, 75 to feed to amplifier 19 only those feedback pulses which are of a polarity opposite to that of the carrier pulses. Evidently, the invention is of application in the instance when the carrier pulses are single polarity pulses. In this instance, the elements 70-86 may be dispensed with by connecting lead 69 directly to the feedback input of amplifier 19, and by supplying that amplifier from pulse stretcher 68 with feedback pulses of a polarity which is constant and opposite to that of the single polarity carrier pulses.

Accordingly, the invention is not to be considered as limited save as is consonant with the character of the following claims.

I claim:

1. Converter apparatus for rate-modulated carrier pulses comprising, accumulator means responsive to sequential actuating pulses of either polarity to produce an analog output which varies with the magnitude of the difference between accumulations by such means of actuating pulses of one and of opposite polarity, encoder means to produce sequential feedback pulses of which the polarity follows in opposed relation the polarity of said carrier pulses, and which occur at a rate determined by controlling said encoder means, pulse summing means responsive to said carrier and feedback pulses to combine them into a common train of sequential pulses while preserving their relative polarities to thereby form said actuating pulses, and regulator means responsive to said output to control said encoder means to produce equalization of said feedback and carrier pulse rates following a change in the latter, whereby said output is rendered an analog signal of the rate modulation of said carrier pulses.

2. Apparatus as in claim 1 in which said accumulator means comprises a potentiometer unit and a stepper motor to drive such unit to produce said output, said motor being responsive to each actuating pulse to rotate unit amount in one and in the opposite direction when such pulse is, respectively, of one and of the opposite polarity.

3. Apparatus as in claim 1 in which said encoder means comprises switch means and cam means for camming said switch means to alternately make and break contacts to thereby generate said feedback pulses.

4. Apparatus as in claim 1 in which said summing means comprises a pulse amplifier.

5. Apparatus as in claim 1 in which said regulator means comprises a rate servo-system.

6. Converter apparatus for carrier pulses which are rate modulated by a modulating signal with respect to a reference rate of zero, and by which opposite polarities of the modulating signal are represented by opposite polarities of said pulses, said apparatus comprising, accumulator means responsive to sequential actuating pulses of either polarity to produce an analog output which varies in sense and magnitude with that of the difference between accumulations by such means of actuating pulses of one and of opposite polarity, encoder means to produce sequential feedback pulses at a rate determined by controlling said encoder means, sign discriminator means to control the polarity of said feedback pulses to follow in opposed relation that of said carrier pulses, pulse summing means responsive to said carrier pulses and to said controlled polarity feedback pulses to combine them into a common train of sequential pulses while preserving their relative polarities to thereby form said actuating pulses, and regulator means responsive to the magnitude of said output to produce equalization of said feedback and carrier pulse rates following a change in the latter, whereby said output is rendered an analog signal of the rate modulation of said carrier pulses.

7. Apparatus as in claim 6 in which said sign discriminator means is adapted to control the polarity of said feedback pulses by responding to the sense of said output from said accumulator means.

8. Apparatus as in claim 6 in which said encoder means comprises, pulse generator means to produce feedback pulses of single polarity at a rate controlled by said regulator means, a pair of gate circuits connected between said pulse generator means and summing means to supply said feedback pulses to the latter through separate signal channels, one and the other of said circuits being selectively gated by said sign discriminator means to pass said feedback pulses, and polarity inverting means disposed in one of said channels, whereby said two channels are adapted to supply opposite polarity feedback pulses to said summing means.

9. Converter apparatus for rate-modulated carrier pulses comprising, a potentiometer unit, a stepper motor responsive to actuating pulses of either polarity to drive said unit so as to produce an electrical analog output which varies in magnitude with the difference between accumulations by such motor of sequential actuating pulses of one and of opposite polarity, encoder means to produce sequential feedback pulses of which the polarity follows in opposed relation the polarity of said carrier pulses, and which occur at a rate determined by controlling said encoder means, pulse summing means responsive to said carrier and feedback pulses to combine them into a common train of sequential pulses while preserving their relative polarities to thereby form said actuating pulses, and a rate servo-system responsive to said output to control said encoder means to produce equalization of said feedback and carrier pulse rates following a change in the latter, whereby said output is rendered an analog signal of the rate modulation of said carrier pulses.

10. Apparatus as in claim 9 in which said potentiometer unit is adapted to provide said output in the form of an alternating signal, and in which said rate servo-system is adapted to be energized by alternating power.

11. Apparatus as in claim 9 in which said rate servo-system comprises, a servo-amplifier connected to receive the output of said potentiometer unit, a servo-motor adapted to rotate under the control of said servo-amplifier, a shaft rotated by said servo-motor, and a tachometer driven by said shaft to produce a rate signal and connected to supply said rate signal as a degenerative feedback signal to said servo-amplifier.

12. Converter apparatus for carrier pulses which are rate-modulated by a modulating signal with respect to a reference rate of zero, and by which opposite polarities of the modulating signal are represented by opposite polarities of said pulses, said apparatus comprising, a potentiometer unit, a stepper motor responsive to actuating pulses of either polarity to drive said unit so as to produce an electrical output which varies in sense and magnitude with that of the difference between accumulations by such means of actuating pulses of one and of opposite polarity, encoder means to produce feedback pulses at a rate determined by controlling said encoder means, sign discriminator means to control the polarity of said feedback pulses to follow in opposed relation that of said carrier pulses, pulse summing means responsive to said carrier pulses and to said controlled polarity feedback pulses to combine them while preserving their relative polarities to thereby form said actuating pulses, and a rate servo-system responsive to said output to control said encoder means to produce equalization of said feedback and carrier pulse rates following a change in the latter, whereby said output is rendered an analog signal of the rate modulation of said carrier pulses.

13. Converter apparatus for carrier pulses which are rate-modulated by a modulating signal with respect to a reference rate of zero, and by which opposite polarities of the modulating signal are represented by opposite polarities of said pulses, said apparatus comprising, a potentiometer unit adapted to be voltage energized and having a winding with a center top and a wiper adapted by contacting said winding to provide a wiper output which has opposite senses when said wiper is positioned on opposite sides of said tap, a stepper motor responsive to actuating pulses of opposite polarity to drive said wiper in opposite directions over said winding in a manner whereby said output varies in sense and magnitude with that of the difference between accumulations by such motor of actuating pulses of one and of opposite polarity, pulse generator means to produce feedback pulses of single polarity at a rate determined by controlling said generator means and to supply said single polarity feedback pulses to two signal channels, inverter means in one of said channels to render the output pulses therefrom of opposite polarity to the output pulses of the other channel, a pair of gate circuits of which each is disposed in a respective one of said channels and of which each is adapted to pass feedback pulses only when rendered conductive, sign discriminator means responsive to the sense of said wiper output to selectively render one and the other of said gate circuits conductive so as to produce passage of feedback pulses through that one of said channels for which the feedback pulses are opposed in polarity to that of the actuating pulses providing the larger of said accumulations, pulse summing means connected to receive said carrier pulses and, also, feedback pulses from either of said channels, said summing means being adapted to combine the received carrier and feedback pulses while preserving their relative polarities to thereby form said actuating pulses, a servo-motor, a servo-amplifier responsive to said wiper output to drive said motor in a direction representing the sense of said wiper output, and a tachometer driven by said servo-motor and connected to supply a degenerative feedback signal to said servo-amplifier to thereby render said motor driven at a rate which varies with the magnitude of said wiper output, said servo-motor being coupled with said pulse generator means to control the operation thereof so as to produce equalization of said feedback and carrier pulse rates following a change in the latter, whereby said wiper output is rendered an analog signal of the rate modulation of said carrier pulses.

14. Apparatus as in claim 13 in which said wiper output and degenerative feedback signals are alternating signals and in which said sign discriminator means is a phase demodulator circuit responsive to the phase of said degenerative feedback signal.

15. Apparatus as in claim 13 in which said pulse generator means comprises, means to produce square wave pulses at a rate controlled by said servo-motor, a circuit to produce opposite polarity trigger pulses by differentiation of the leading and lagging edges of said square wave pulses, and a circuit to clip those of said trigger pulses of one polarity and to pass those of said trigger pulses of the other polarity as said single polarity feedback pulses to said two signal channels.

16. Apparatus as in claim 13 in which pulse stretcher means is interposed between said pulse generator means and said summing means to stretch said feedback pulses.

17. Apparatus as in claim 13 in which pulse stretcher means is connected in said apparatus ahead of said summing means to stretch said carrier pulses prior to application thereof to said summing means.

References Cited in the file of this patent
UNITED STATES PATENTS

| | | |
|---|---|---|
| 2,782,408 | Fisher et al. | Feb. 16, 1957 |
| 2,877,398 | Gimpel et al. | Mar. 10, 1959 |
| 2,922,095 | Hesse et al. | Jan. 19, 1960 |

OTHER REFERENCES

Handbook of Automation, Computation and Control, Vol. I, Basic Fundamentals and Vol. II, "Computers and Data Processing," by Grabbe, Ramo and Wooldridge, published by John Wiley and Sons. (Copyright 1958.)